United States Patent
Schofield et al.

(10) Patent No.: US 9,279,426 B2
(45) Date of Patent: Mar. 8, 2016

(54) MULTI STAGE, CLAM SHELL VACUUM PUMP

(75) Inventors: Nigel Paul Schofield, Horsham (GB); Stephen Dowdeswell, Cuckfield (GB)

(73) Assignee: Edwards Limited, Crawley, West Sussex (GB)

( * ) Notice: Subject to any disclaimer, the term of this patent is extended or adjusted under 35 U.S.C. 154(b) by 658 days.

(21) Appl. No.: 12/678,261

(22) PCT Filed: Oct. 1, 2008

(86) PCT No.: PCT/GB2008/050886
§ 371 (c)(1),
(2), (4) Date: May 19, 2010

(87) PCT Pub. No.: WO2009/044197
PCT Pub. Date: Apr. 9, 2009

(65) Prior Publication Data
US 2010/0226808 A1    Sep. 9, 2010

(30) Foreign Application Priority Data
Oct. 4, 2007   (GB) .................................. 0719394.9

(51) Int. Cl.
*F04C 27/00*   (2006.01)
*F16N 13/20*   (2006.01)
(Continued)

(52) U.S. Cl.
CPC ............. *F04C 18/126* (2013.01); *F04C 23/001* (2013.01); *F04C 27/02* (2013.01); *F16J 15/002* (2013.01); *F16J 15/14* (2013.01); *F04C 2240/30* (2013.01)

(58) Field of Classification Search
CPC .......... F04C 18/00; F04C 23/00; F04C 27/00; F16J 15/00

USPC .......... 418/206.6, 9, 15, 126, 149, 189, 206.1
See application file for complete search history.

(56) References Cited

U.S. PATENT DOCUMENTS 5,385,409 A * 1/1995 Ide .............................. 277/400
5,760,292 A * 6/1998 Jostein .......................... 73/46
(Continued)

FOREIGN PATENT DOCUMENTS

EP         1050699 A2    11/2000
WO    2004099620 A1    11/2004

OTHER PUBLICATIONS

Definition of Array by the Free Online Dictionary, Thesasurus and Encyclopedia, Fourth Edition 2000, Houghton Mifflin Company.*

(Continued)

*Primary Examiner* — Kenneth Bomberg
*Assistant Examiner* — Deming Wan
(74) *Attorney, Agent, or Firm* — Westman, Champlin & Koehler, P.A.

(57) ABSTRACT

A multi-stage, clam shell, vacuum pump comprises two housing components (12) which are to be sealingly connected to one another such that an array of chambers extending longitudinally from an inlet region of the pump to an outlet region of the pump is defined thereby. Sealing means (30) are provided within the vacuum pump, between the two housing components, to prevent transfer of fluid in to and out of the vacuum pump where said components are connected. An array of discrete, elongate channels (33, 34, 36, 38) is provided, located between the sealing means (30) and the array of chambers (14, 16, 18, 20, 22). The channels serve to protect the sealing means (30) from fluid that passes through the chambers during operation of the vacuum pump. Each channel is configured to receive a barrier fluid having a different pressure than a barrier fluid to be received by an adjacent channel.

14 Claims, 4 Drawing Sheets

(51) Int. Cl.
*F04C 18/00* (2006.01)
*F04C 2/00* (2006.01)
*F04C 18/12* (2006.01)
*F04C 23/00* (2006.01)
*F04C 27/02* (2006.01)
*F16J 15/00* (2006.01)
*F16J 15/14* (2006.01)

(56) References Cited

U.S. PATENT DOCUMENTS

| | | | |
|---|---|---|---|
| 5,769,604 A * | 6/1998 | Gardner et al. | 415/170.1 |
| 6,471,497 B2 * | 10/2002 | Suzuki et al. | 418/9 |
| 6,572,351 B2 * | 6/2003 | Durand et al. | 418/9 |
| 6,776,586 B2 * | 8/2004 | Naito et al. | 417/244 |
| 7,108,492 B2 * | 9/2006 | Yamamoto et al. | 418/5 |
| 7,214,041 B2 * | 5/2007 | Birch et al. | 418/9 |
| 2002/0155014 A1 | 10/2002 | Durand et al. | |
| 2009/0269231 A1 * | 10/2009 | Birch et al. | 418/1 |
| 2010/0158728 A1 * | 6/2010 | Schofield et al. | 418/9 |

OTHER PUBLICATIONS

PCT International Search Report for corresponding PCT Application No. PCT/GB2008/050886, dated Mar. 18, 2009.
PCT Written Opinion for corresponding PCT Application No. PCT/GB2008/050886, dated Mar. 18, 2009.
United Kingdom Search Report dated Feb. 1, 2008 of Application No. GB0719394.9, filed Oct. 4, 2007.
Prosecution history of corresponding Chinese Application No. 200880109925.2 including: First Office Action dated Feb. 15, 2012.
Prosecution history of corresponding Japanese Application No. 2010-527545 including: Office Action dated Apr. 18, 2013.

* cited by examiner

MULTI STAGE, CLAM SHELL VACUUM PUMP

BACKGROUND OF THE INVENTION

This invention relates to multi stage, clam shell vacuum pumps. In particular, seal assemblies used in such vacuum pumps.

Vacuum pumps are known which are oil-free in their vacuum chambers and which are therefore useful in clean environments such as those found in the semiconductor industry. In such a manufacturing environment, if lubricants were present in the vacuum chambers, these materials could potentially back migrate into the process chamber and, in so doing, may cause contamination of the product being manufactured. Such dry vacuum pumps are commonly multi-stage positive displacement pumps employing intermeshing rotors in each vacuum chamber. The rotors may have the same type of profile in each chamber or the profile may change from chamber to chamber.

It is known to form the housing of such a multistage vacuum pump from two half-shell stator components, which define the plurality of pumping chambers and the fluid transfer channels for conveying gas between the pumping chambers. It is necessary to provide a sealing means between the two stator components in order to prevent leakage of the process gas from the pump and to prevent any ambient air from entering the pump. A line of sealant is typically provided to perform this sealing function.

In clean environments, such as a load lock application, the integrity of the sealing means is not jeopardised and so the sealing properties of the sealing means are maintained. However, in a harsh environment, such as may be found within a process pump, exposure to corrosive process gases may cause the sealing means to deteriorate. The deterioration of the sealing means leads to replacement of the sealant, thus causing costly servicing down times for the entire process. Furthermore, contact surfaces of the stator can experience corrosion, which can lead to anomalies in these surfaces such that distortion of the pump case can occur. This distortion leads to a reduction in clearance between rotating and static components that, in turn, can affect the mechanical reliability of the pump.

Conventional systems are known which introduce mechanical barriers to protect the static sealing mechanism by reducing the quantity of corrosive gaseous material that reaches the sealing means. However, compatibility must be achieved between the material chosen to form this mechanical barrier and the process gas. Furthermore, additional complexity is introduced into the system by the presence of such a mechanical barrier and such a mechanical barrier will not generally protect the contact faces of the stators.

BRIEF SUMMARY OF THE INVENTION

The present invention aims at overcoming the aforementioned problems by providing an alternative, simple means for protecting the sealing means and the contacting stator faces.

According to a first aspect, the present invention provides a multi-stage, clam shell, vacuum pump comprising:
two housing components to be sealingly connected to one another thereby defining an array of chambers, the array extending longitudinally from an inlet region of the pump to an outlet region of the pump;
sealing means, located between the two housing components to prevent transfer of fluid in to and out of the vacuum pump at a connection between said two housing components; and
an array of discrete, elongate channels, located between the sealing means and the array of chambers for protecting the sealing means from fluid passing through the chambers, each channel being configured to receive a barrier fluid having a different pressure than a barrier fluid to be received by an adjacent channel.

By providing discrete, elongate channels into which barrier fluid of different pressures may be supplied, the sealing means can be protected from exposure to process fluids being conveyed through the vacuum pump, whilst minimising the introduction of said barrier fluid into inlet stages of the vacuum pump. Consequently, the performance of a clam shell vacuum pump can be maintained, whilst the service interval for the vacuum pump can be increased.

The array of channels may be substantially co-linear.

The chambers may be pumping chambers, the housing components each being half-shell stator components and/or the chambers may be transfer chambers, a first housing component being a half-shell stator component and the second housing component being a cover plate.

The array of channels may extend from the outlet region of the vacuum pump towards the inlet region of the vacuum pump or the array of channels may extend to the inlet portion of the vacuum pump.

One of the discrete, channels may be configured to deliver purge gas directly into a pumping chamber of the vacuum pump.

The vacuum pump preferably further comprise a head plate connected to one of the housing components, with a sealing means located between the head plate and the housing component to prevent transfer of fluid into and out of the pump. The head plate preferably comprises a head plate channel, located between the sealing means and the chambers of the vacuum pump, also configured to receive barrier fluid to protect the sealing means from fluid passing through the chambers.

The head plate channel is in advantageously in fluid communication with and receives barrier fluid from at least one of the adjacent channels on the housing component.

It is particularly advantageous if the head plate channel is also in fluid communication with adjacent channels on opposite sides of the chambers of the housing component, with the head plate channel configured to receive barrier fluid from one an adjacent channel on one side of the chambers and convey said barrier gas to an adjacent channel on the opposite side of the chambers.

In addition, is also advantageous if the head plate channel is able to supply barrier fluid to adjacent channels on the housing component.

The sealing means may be an o-ring or it may be provided by a line of sealant.

The pressure at which barrier fluid is received in said array of channels increases from one channel to an adjacent channel across said array.

BRIEF DESCRIPTION OF THE SEVERAL VIEWS OF THE DRAWGINS

The present invention will now be described, by way of example only, with reference to the accompanying drawings, in which.

DETAILED DESCRIPTION OF THE INVENTION

Figure 1:
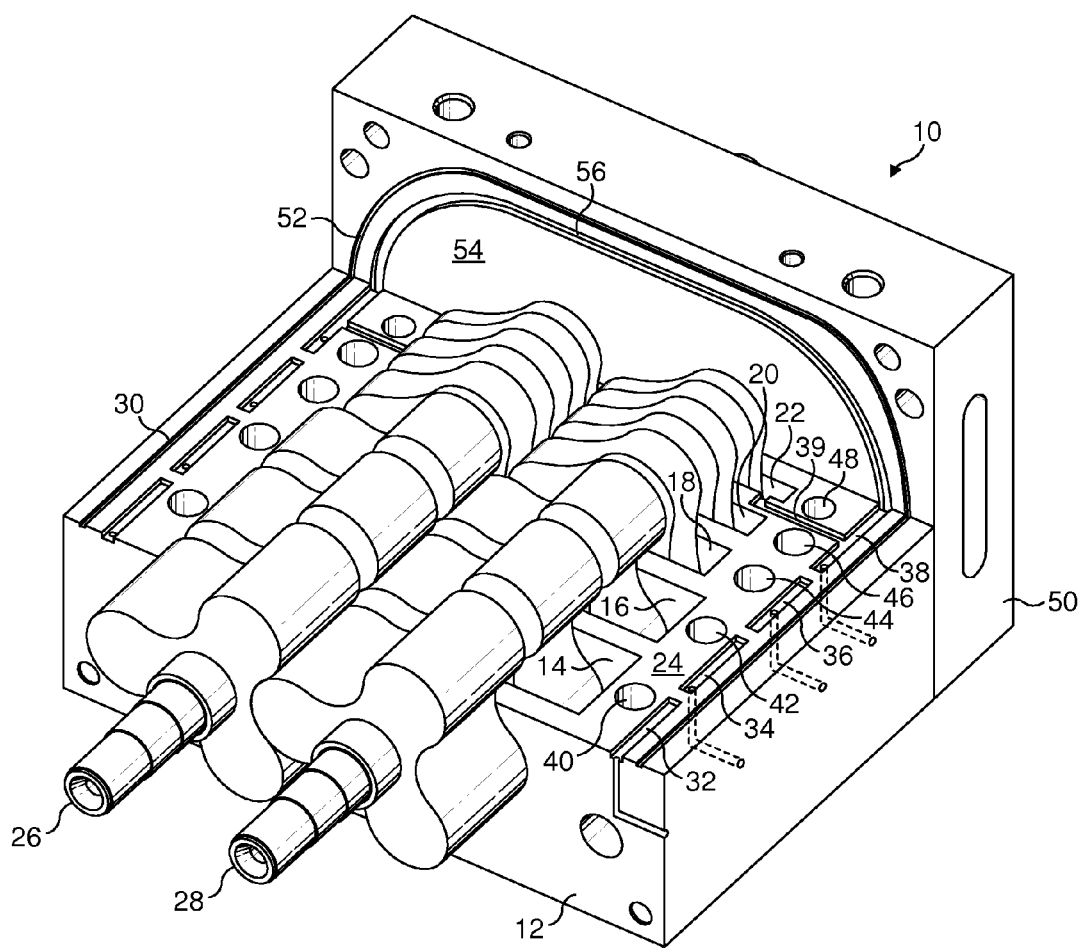
FIG. 1 is an isometric view of part of a vacuum pump.

FIG. 1 illustrates part of a clam shell vacuum pump 10. A lower half shell stator component 12 is illustrated having a number of cavities 14, 16, 18, 20, 22 formed in a surface 24 thereof. A pair of cooperating rotor assemblies 26, 28 are mounted in the vacuum pump 10 such that each pair of cooperating rotors are located within a respective cavity 14, 16, 18, 20, 22. Upon assembly of the vacuum pump 10, a second, upper, half shell stator (not shown) is positioned over the rotor assemblies 26, 28 such that rotors protrude into corresponding cavities formed in the second half shell stator. Each pair of cavities forms a respective pumping chamber (not shown). The pumping chambers are collectively referred to as a swept volume of the vacuum pump 10. Transfer channels 40, 42, 44, 46, 48 are provided in stator component 12. Transfer channels, in this example, surround the envelope of the pumping chamber and serve to convey process fluid from one pumping chamber to the next. For example, channel 40 serves to convey fluid from pumping chamber 14 to pumping chamber 16.

Sealing means, which in this example is a line of sealant 30, is applied to each peripheral edge of surface 24 as illustrated in FIG. 1. The sealant 30 is, for example, an anaerobic sealant 30 and is applied using a silk screen technique. The sealant 30 sets when the two half shell stator components are joined together using bolts (not shown). The sealant 30 provides a fluid tight seal between the stator components and serves to prevent ingress of ambient air into the swept volume of the vacuum pump 10 and egress of process fluid from the swept volume of the vacuum pump into the atmosphere.

It is often necessary to run vacuum pumps at an elevated temperature in order to avoid condensation of any process fluids flowing therethrough. If such process fluids did condense deposits would form which, in turn, would interfere with the operation/performance of the rotating mechanism, such as rotor assemblies 26, 28. However, given this elevated temperature, there is an increased propensity for the harsh fluids passing through the pump to react with the materials of the pump, for example stator surface 24 and sealant 30.

Elongate channels 32, 34, 36, 38 are provided in stator surface 24 between sealant 30 and the swept volume of the vacuum pump 10. Barrier fluid is delivered to the channels 32, 34, 36, 38 so that a curtain of barrier fluid is provided between the sealant and the process fluids being conveyed through the swept volume. The channels may be co-linear as shown.

A pump is typically supplied with a purge gas, this gas being chosen to be unreactive under the given conditions, such as nitrogen. This purge gas serves to dilute the process gases in the pump to encourage the partial pressure of the process to remain below the saturated value at which condensation may start to form. The purge gas is generally introduced directly into the swept volume through a purge fluid inlet to mix with the process gases. The purge gas is typically supplied at an elevated pressure when compared to the process gases and, therefore passes into the swept volume without undue resistance.

The barrier fluid may be supplied from the same source as the purge gas, i.e. nitrogen. However, it may be any fluid that is unreactive with materials of the vacuum pump, in particular the sealing means.

Excess barrier fluid leaks out of the channels 32, 34, 36, 38 towards the lower pressure swept volume. Consequently, stator surface 24 is constantly flushed with the barrier fluid such that process fluid is not drawn over the surface. If the stator surface 24 is temporarily exposed to process fluid, the process fluid is rapidly diluted and dispersed by the barrier fluid.

Purge gas may be supplied to the swept volume via barrier fluid channels. For example, conduit 39 is illustrated in FIG. 1 extending between channel 38 and pumping chamber 22.

Purge gas may also be supplied to a transfer port 40, 42, 44 and 46, 48 via a conduit (not shown) from any of the channels 32, 34, 36, 38.

It is necessary to provide a plurality of discrete channels 32, 34, 36, 38 as each channel is supplied with a barrier fluid having a different pressure. The pressure of barrier fluid in a particular channel reflects, but is not identical to, the pressure of the process fluids being conveyed through an adjacent pumping chamber. For example, the channel 38 adjacent to high pressure pumping chambers 20, 22 in an outlet region of the vacuum pump may be supplied with a barrier fluid of approximately 1200 mbar. In contrast, the channel 32, adjacent to the lowest pressure pumping chamber 14 in an inlet region of the vacuum pump may be supplied with a barrier fluid having a pressure of approximately 20 to 50 mbar.

The number of channels 32, 34, 36, 38 provided in surface 24 of the half shell stator component 12 need not correspond to the number of pumping chambers. Indeed, in this example, four channels 32, 34, 36, 38 are provided even though five pumping chambers are formed within the half shell stator component 12. The channels 32, 34, 36, 38 may extend the entire length of the stator components 12 as illustrated or they may just be located towards the outlet region of the vacuum pump 10, where the process fluids are at an elevated temperature and pressure.

Discrete channels 32, 34, 36, 38 are provided to enable barrier fluids having different pressures to be supplied thereto. In providing these discrete channels 32, 34, 36, 38 a curtain of barrier fluid is provided having a pressure gradient which changes from the inlet region of the pump to the outlet region of the pump. In so doing, a smaller pressure difference is achieved between each pumping chamber and an adjacent channel than would be the case with a single channel having barrier fluid supplied thereto at a single pressure. Consequently, less leakage will occur between the channels and the pumping chambers. This reduced level of leakage minimises the quantity of barrier fluid consumed by the vacuum pump. By minimising the barrier fluid that is introduced to the pump and ultimately into the swept volume, in particular into an inlet region of the vacuum pump, the performance of the vacuum pump can be maximised.

By minimising the exposure of surface 24 and sealant 30 to corrosive process fluids, the deterioration of this surface and the sealing means can be minimised which, in turn, increases the maintenance interval of the pump. Hence the vacuum pump can remain operational for longer periods and costly down-time of the entire process served by the vacuum pump can be minimised.

FIG. 1 also illustrates a head plate 50 connected to the half shell stator component 12. A further sealing means, such as an o-ring 52 is provided between head plate 50 and the half shell stators 12. In a similar manner to that described above, the further sealing means and a surface of the head plate 54 adjacent to the half shell stator components 12 are protected by forming a head plate channel 56 between the location of the o-ring and the swept volume. Barrier fluid is supplied to channel 56 and leaks from channel 56 to the swept volume along surface 54 towards a pumping chamber at the outlet of the pump. Head plate channel 56 may be configured such that it is aligned and in fluid communication with the channel 38, provided on stator surface 24. In this way, a single supply of barrier fluid may be provided to both channels 38, 56.

Figure 2:
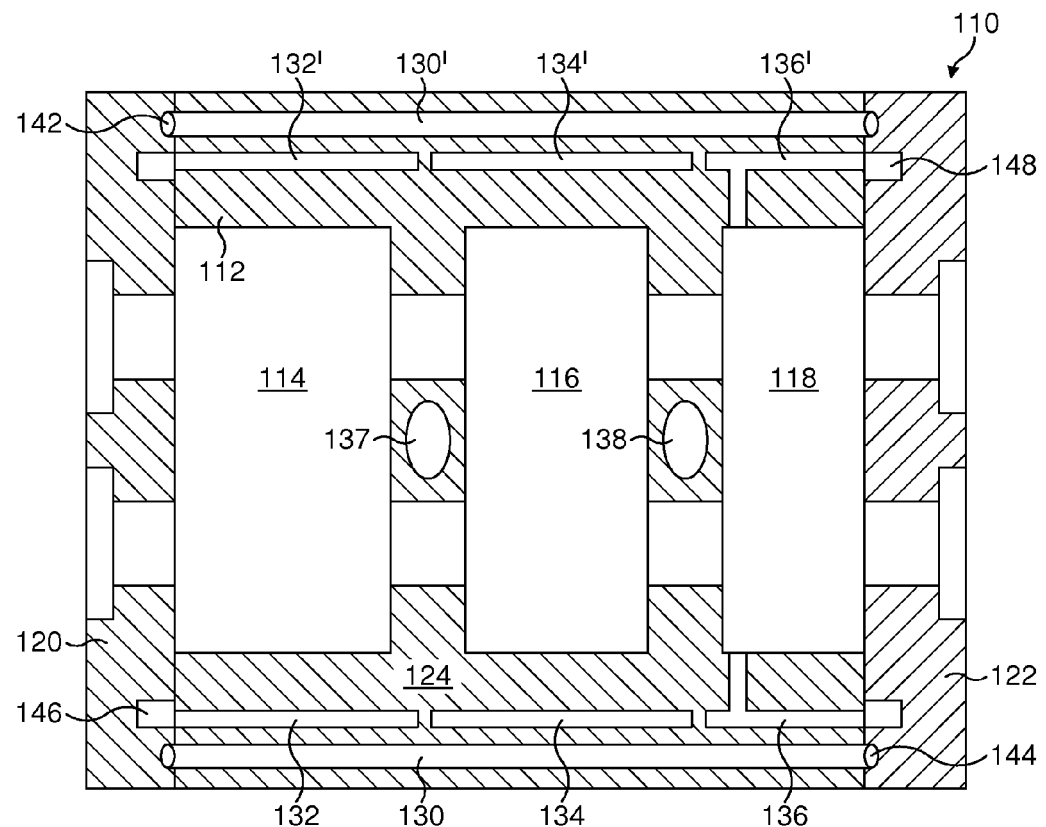
FIG. 2 is a plan view of a schematic of an alternative vacuum pump.

FIG. 2 illustrates an alternative vacuum pump 110, comprising a half shell stator component 112 having three pumping chambers 114, 116, 118 provided therein. Head plates 120, 122 are provided at each end of the half shell stator component 112. Sealing means 130, 130', e.g. a line of anaerobic sealant, is provided at each lateral peripheral region of surface 124 of half shell stator component 112 in a similar manner to that described above in relation to the first example. In this example, transfer channels 137, 138 are provided between the pumping chambers rather than about the pumping chambers as in the previous example. Such a configuration extends the length of vacuum pump 110 but reduces the lateral dimension when compared to the configuration of vacuum pump 10.

Elongate discrete channels 132, 134, 136 for receiving barrier fluid are provided in surface 124 of half shell stator component 112 to protect sealing means 130. The channel arrangement is repeated in channels 132', 134', 136' on the opposite side of the vacuum pump to protect sealing means 130'.

Sealing means, eg. sealant or, as depicted in this example, o-rings 142, 144 are provided between each of the head plates 120, 122 and the half shell stator component 112. Channels 146, 148 are provided between the swept volume and the o-rings 142, 144 to protect the o-rings from the detrimental effects of any exposure to corrosive process fluids passing through the pumping chambers 114, 116, 118. As illustrated, channel 146 is in fluid communication with channels 132, 132' and channel 148 is in fluid communication with channels 136, 136'. Consequently, a single supply of barrier fluid can be provided to channels 132, 132' and 146 in combination and a separate single supply of barrier fluid having a different, elevated pressure can be supplied to channels 136, 136' and 144.

Figure 3:
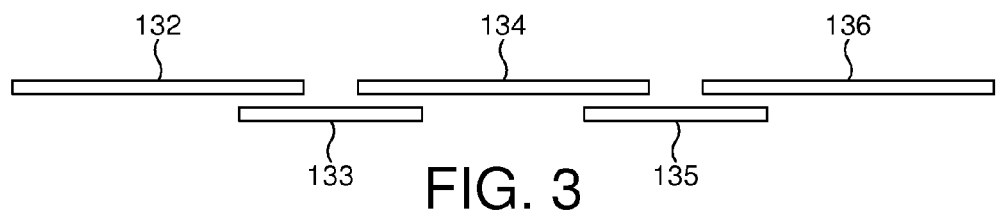
FIG. 3 represents alternatively configured barrier fluid channels.

FIGS. 1 and 2 each illustrate an array of barrier fluid channels separated from one another and having a land formed there between. Fluid from each channel adjacent to this land will leak out of the respective fluid channel and merge in this region so that the curtain of barrier fluid is continuous but will have an intermediate pressure in this region. Alternatively, if a more comprehensive coverage is required, the channels 132, 133, 134, 135, 136 can be arranged in a staggered configuration as illustrated in FIG. 3.

Figure 4:
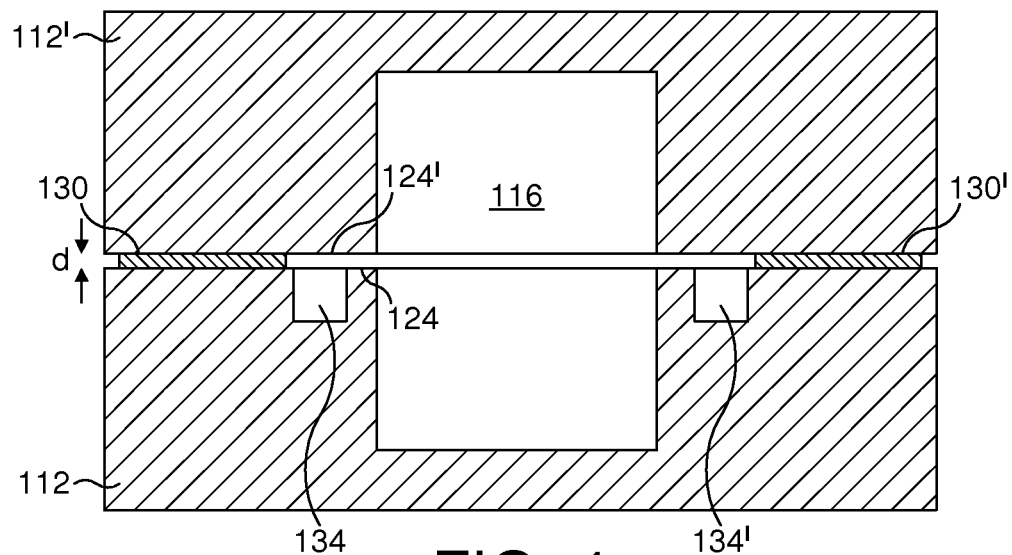
FIG. 4 is a schematic cross-section end view of a vacuum pump.

FIG. 4 represents a schematic cross-section of a vacuum pump of the type illustrated in FIG. 2. As shown, it is apparent that sealant 130, 130' is applied on a surface 124 such that when half shell stator components 112, 112' are brought together, the sealant 130, 130' causes a separation of the faces 124, 124' for example 0.01 to 0.05 mm. The separation "d" provides a clear fluid flow path from channels 134, 134' into the pumping chamber 116.

Figure 5:
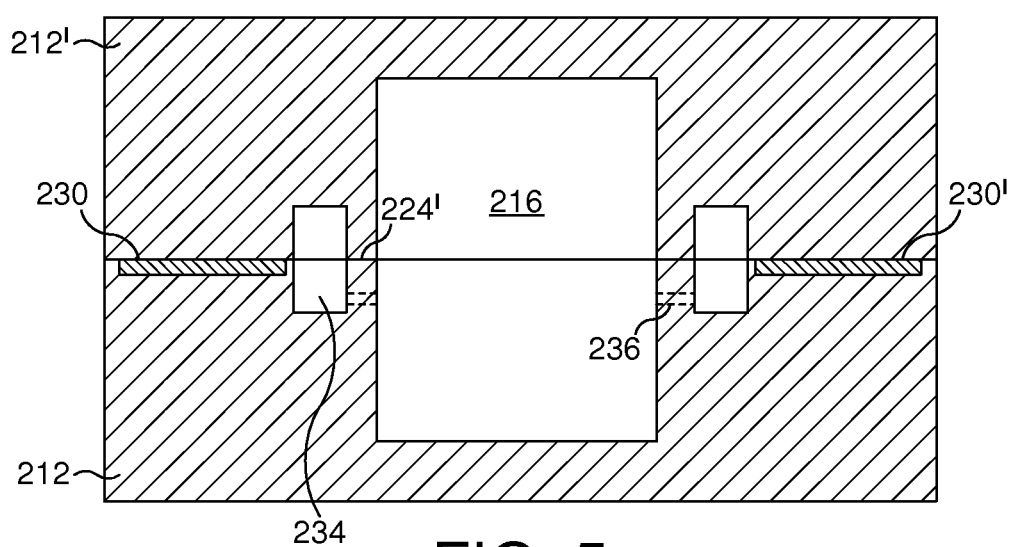
FIG. 5 is a schematic cross-section end view of another vacuum pump.

In an alternative example, as illustrated in FIG. 5, the barrier fluid channel 234 may be formed partly in a first half shell stator component 212 of a vacuum pump and partially in a second stator component 212'. Furthermore, as illustrated in FIG. 4, sealant 130, 130' stands proud of each half shell stator 112, 112' such that clearance d is formed there between. However, as illustrated in FIG. 5, sealant 230 may be recessed into a surface 224 of half shell stator component 212 or, indeed, half shell stator component 212' such that sealing surfaces of 224' each half shell stator component may come into contact with one another directly. In this latter example, flow of both barrier fluid and process fluid, between the two half shell stator components 212, 212' is significantly reduced. In such an example the barrier fluid is provided primarily to protect the sealant 230 and a separate outlet 236 may be provided between barrier fluid channel 234 and an adjacent pumping chamber 216 to enable barrier fluid to pass directly into a swept volume of the vacuum pump.

Figure 6:
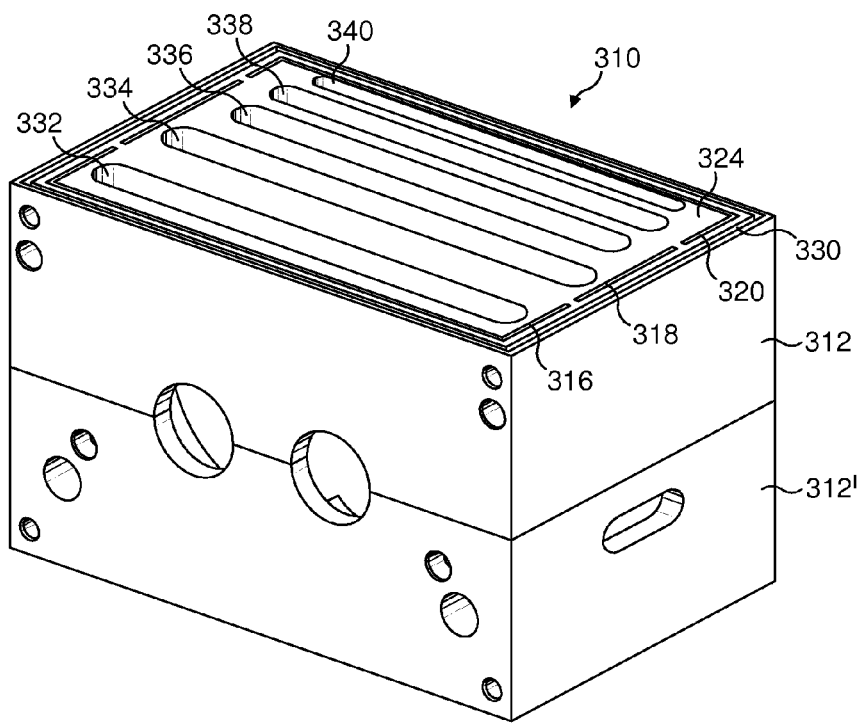
FIG. 6 is an isometric view of part of a stator of a vacuum pump.

The sealing means of the previous examples can be used in any circumstances where a stator or housing component has a plurality of chambers formed therein, each chamber having, in operation, a fluid of a different pressure passing therethrough. An alternative example of such a component is illustrated in FIG. 6. The components shown are stator components 312, 312' of a vacuum pump 310, and indeed may be the same vacuum pump as illustrated in FIG. 1. However, in FIG. 6 an external surface 324 of a stator component 312 has formed therein a plurality of transfer chambers 332, 334, 336, 338, 340. In use, fluid enters these transfer chambers from each respective pumping chamber and is conveyed around the pumping chamber through the material of the stator 312 and is passed to the next, subsequent pumping chamber. The transfer chambers 332, 334, 336, 338, 340 are each closed by covering surface 324 with a cover plate 314 (illustrated in FIG. 7). Sealing means 330 is provided between surface 324 and cover plate 314 to prevent egress of process fluid from the vacuum pump 310 and ingress of ambient air into the vacuum pump 310.

It is desirable to provide a protective fluid curtain between the transfer chambers and the sealing means 330. As in the previous example, the transfer chambers 332, 334, 336, 338, 340 formed in the external surface 324 of the half shell stator component 312 each receive a fluid having a different pressure to the other transfer chambers during operation of the vacuum pump 310. Consequently, the fluid curtain is provided by forming discrete, elongate channels 316, 318, 320 for receiving barrier fluid at different pressures. Once again, a lower pressure barrier gas is supplied to channel 316, proximate an inlet region of the vacuum pump 310 and a higher pressure barrier gas is supplied to channel 320 proximate an outlet region of the vacuum pump 310.

Excess barrier fluid leaks out of channels 316, 318, 320 by virtue of the pressure difference between these channels and the transfer chambers. The excess barrier fluid serves to flush surface 324 to dilute and disperse any process fluid that comes into contact with the surface 324.

Figure 7:
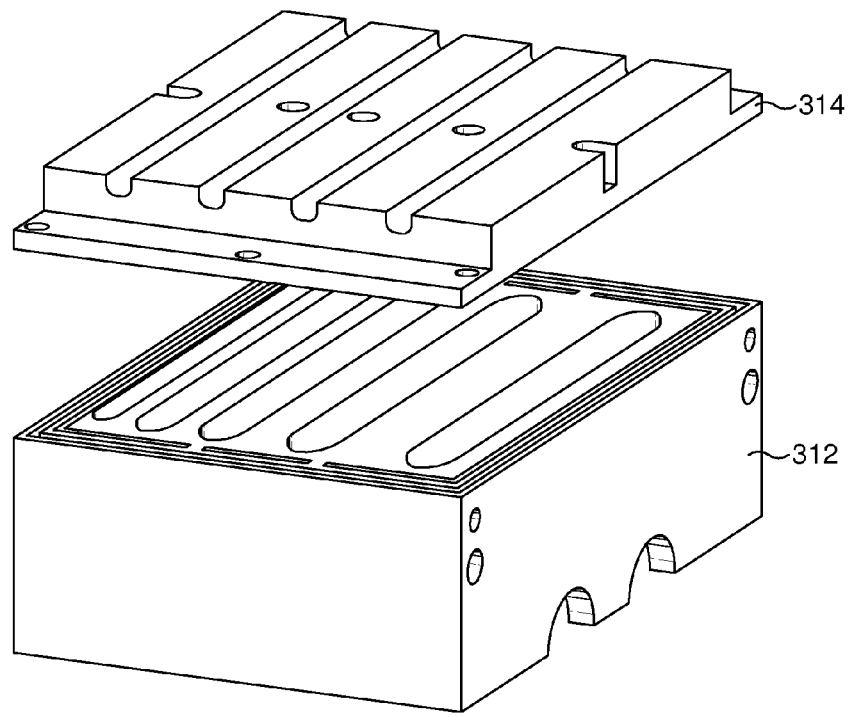
FIG. 7 is an exploded view of part of the vacuum pump of FIG. 6, illustrating a cover plate for closing the transfer chambers formed in the stator.

FIG. 7 illustrates an exploded, isometric view of part of the vacuum pump 310 shown in FIG. 6 and illustrates the cover plate 314 which is used to close the transfer chambers.

In a vacuum pump having a configuration whereby the transfer chambers surround the pumping chambers as illustrated in FIGS. 6 and 7, the second half shell stator component 312' also has transfer chambers formed in an external surface thereof. This external surface is also closed by a cover plate and sealing means is provided between the external surface and the cover plate. Discrete, elongate channels can be provided between the transfer chambers and the sealing means in the second half shell stator component 312' in a similar manner to that described above.

In summary, by providing a plurality of discrete channels for receiving barrier gas at different pressures a fluid curtain can be formed having a graduated pressure characteristic which can reflect the changing pressure along a longitudinal extent of a vacuum pump in a way that is not possible when a single, continuous channel is provided.

We claim:

1. A multi-stage vacuum pump comprising:
    two housing components with at least one of the two housing components comprising a plurality of cavities, the two housing components to be sealingly connected to one another thereby defining an array of chambers comprising a plurality of chambers defined between the two housing components such that each of the plurality of chambers is defined in part by a respective one of the plurality of cavities of one of the two housing components and in part by the other of the two housing components, the array of chambers extending longitudinally from an inlet region of the pump to an outlet region of the pump;
    sealing means, extending longitudinally along the array of chambers such that the sealing means is at a connection between the two housing components along each chamber of the array of chambers to prevent transfer of fluid in to and out of the vacuum pump at the connection between said two housing components; and
    an array of discrete, elongate channels, located between the sealing means and the array of chambers for protecting the sealing means from fluid passing through the chambers, each channel is at the connection between said two housing components and each channel being configured to receive a barrier fluid having a different pressure than a barrier fluid to be received by an adjacent channel and each channel extending longitudinally along fewer chambers of the array of chambers than the sealing means extends along.

2. The vacuum pump according to claim 1, wherein the array of elongate channels is substantially co-linear.

3. The vacuum pump according to claim 1, wherein the chambers are pumping chambers and the housing components are each half-shell stator components.

4. The vacuum pump according to claim 1, wherein the chambers are transfer chambers and a first housing component is a half-shell stator component and the second housing component is a cover plate.

5. The vacuum pump according to claim 1, wherein the array of elongate channels extends from the outlet region of the vacuum pump towards the inlet region of the vacuum pump.

6. The vacuum pump according to claim 1, wherein at least one of the discrete, elongate channels is configured to deliver purge gas directly into a pumping chamber or a transfer channel of the vacuum pump.

7. The vacuum pump according to claim 1, further comprising at least one head plate connected to at least one of the housing components; sealing means located between the head plate and the housing component to prevent transfer of fluid into and out of the pump; and a head plate channel located between said sealing means and the chambers, the head plate channel configured to receive barrier fluid to protect said sealing means from fluid passing through the chambers.

8. The vacuum pump according to claim 7, wherein the head plate channel is in fluid communication with and receives barrier fluid from at least one adjacent channel on the housing component.

9. The vacuum pump according to claim 8, wherein the head plate channel is in fluid communication with adjacent channels on opposite sides of the chambers of the housing component, said head plate channel configured to receive barrier fluid from an adjacent channel on one side of the chambers and convey it to an adjacent channel on the opposite side of the chambers.

10. The vacuum pump according to claim 7, wherein the head plate channel is in fluid communication with and conveys barrier fluid to at least one adjacent channel on the housing component.

11. The vacuum pump according to claim 1, wherein the sealing means is an o-ring.

12. The vacuum pump according to claim 1, wherein the sealing means is a line of sealant.

13. The vacuum pump according to claim 1, wherein the pressure at which the barrier fluid is received in said array of elongate channels increases from one of the elongate channels to an adjacent one of the elongate channels across the array.

14. The vacuum pump according to claim 1 wherein the array of discrete, elongate channels is arranged in a staggered configuration.

* * * * *